(12) United States Patent
Myojin

(10) Patent No.: US 7,893,591 B2
(45) Date of Patent: Feb. 22, 2011

(54) LAMINATED ROTOR CORE AND METHOD FOR MANUFACTURING THE SAME

(75) Inventor: Iwao Myojin, Kitakyushu (JP)

(73) Assignee: Mitsui High-Tec, Inc., Kitakyushu-shi, Fukuoka (JP)

( * ) Notice: Subject to any disclaimer, the term of this patent is extended or adjusted under 35 U.S.C. 154(b) by 381 days.

(21) Appl. No.: 12/089,570

(22) PCT Filed: Sep. 12, 2007

(86) PCT No.: PCT/JP2007/067760

§ 371 (c)(1),
(2), (4) Date: Apr. 8, 2008

(87) PCT Pub. No.: WO2008/044420

PCT Pub. Date: Apr. 17, 2008

(65) Prior Publication Data

US 2009/0146519 A1  Jun. 11, 2009

(30) Foreign Application Priority Data

Oct. 13, 2006 (JP) .............................. 2006-280452

(51) Int. Cl.
*H02K 1/06* (2006.01)
(52) U.S. Cl. ..................... 310/216.013; 310/216.043; 310/216.046; 310/216.047; 310/216.063; 310/156.53
(58) Field of Classification Search ............ 310/156.53, 310/216.013, 216.043, 216.046, 216.047, 310/216.063
See application file for complete search history.

(56) References Cited

U.S. PATENT DOCUMENTS 3,270,231 A * 8/1966 Wiley .................. 310/216.043

(Continued)

FOREIGN PATENT DOCUMENTS

JP  51-40506 A  4/1976

(Continued)

OTHER PUBLICATIONS

Decision of Refusal dated May 13, 2008, issued in corresponding Japanese Patent Application No. 2006-280452 and English translation.

(Continued)

*Primary Examiner*—Quyen Leung
*Assistant Examiner*—Alex W Mok
(74) *Attorney, Agent, or Firm*—Westerman, Hattori, Daniels & Adrian, LLP

(57) ABSTRACT

A stamping step of forming a plurality of band-shaped core sheets (11), (12) having arc-shaped segment core sheets (15), (15*a*), the adjacent segment core sheets (15), (15*a*) connected together by narrow-width connecting portions (16), (16*a*) provided therebetween, the segment core sheets (15), (15*a*) having a plurality of pole sections (13), (14), (13*a*), (14*a*) protruding radially outward; and an annular shape forming step of winding the plurality of band-shaped core sheets (11), (12) in a spiral form while bending the band-shaped core sheets (11), (12) at the connecting portions (16), (16*a*) and superimposing the pole sections (13), (14), (13*a*), (14*a*) vertically one on another, thereby laminating the band-shaped core sheets (11), (12); wherein in the stamping step, notches (23*a*), (23) to be positioned in correspondence with the connecting portions (16), (16*a*) bent in the annular shape forming step are formed at radially outward sides of joining portions (22*a*), (22), the joining portions joining the adjacent pole sections (13*a*), (14*a*), (13), (14) in the segment core sheets (15*a*), (15) and positioned above and below the bent connecting portions (16), (16*a*).

17 Claims, 5 Drawing Sheets

U.S. PATENT DOCUMENTS

| | | | |
|---|---|---|---|
| 4,365,180 A * | 12/1982 | Licata et al. | 310/216.008 |
| 5,986,377 A * | 11/1999 | Yamada et al. | 310/216.013 |
| 6,313,559 B1 | 11/2001 | Kusase et al. | |
| 6,630,766 B1 * | 10/2003 | Kirn et al. | 310/418 |
| 2001/0005933 A1 * | 7/2001 | Kazama et al. | 29/596 |
| 2002/0163277 A1 | 11/2002 | Miyake et al. | |
| 2003/0127938 A1 * | 7/2003 | Shen et al. | 310/216 |
| 2004/0061407 A1 | 4/2004 | Miyake et al. | |
| 2004/0061413 A1 | 4/2004 | Miyake et al. | |
| 2005/0067912 A1 * | 3/2005 | Murakami et al. | 310/216 |
| 2006/0119204 A1 | 6/2006 | Awazu et al. | |
| 2007/0046125 A1 * | 3/2007 | Torii et al. | 310/156.53 |

FOREIGN PATENT DOCUMENTS

| | | |
|---|---|---|
| JP | 1-264548 A | 10/1989 |
| JP | 5-184105 A | 7/1993 |
| JP | 08-196061 A | 7/1996 |
| JP | 11-098774 A | 4/1999 |
| JP | 11-299136 A | 10/1999 |
| JP | 2000-152526 A | 5/2000 |
| JP | 2000-358348 A | 12/2000 |
| JP | 2001-268825 A | 9/2001 |
| JP | 2004-505595 A | 2/2004 |
| JP | 2005-168128 A | 6/2005 |
| JP | 2005-210790 A | 8/2005 |
| JP | 2006-157998 A | 6/2006 |
| JP | 2006-158037 A | 6/2006 |
| JP | 2006166498 A * | 6/2006 |
| JP | 2006223076 A * | 8/2006 |
| WO | 02-19498 A1 | 3/2002 |

OTHER PUBLICATIONS

International Search Report of PCT/JP2007/067760; date of mailing Dec. 4, 2007.

* cited by examiner

PRIOR ART

LAMINATED ROTOR CORE AND METHOD FOR MANUFACTURING THE SAME

TECHNICAL FIELD

The present invention relates to a laminated rotor core formed by effectively using a core material and applied to a motor or a generator, and a method for manufacturing the laminated rotor core.

BACKGROUND ART

To improve a yield of a material from which core sheets are stamped, a laminated rotor core is produced by stamping segment core sheets (also referred to as separate core sheets) in the form of divided core sheets, laminating the segment core sheets to form separate laminated cores, and subsequently assembling the separate laminated cores. Another method for producing a laminated rotor core with improved material yield involves stamping a band in predetermined shape consisting of connected segment core sheets, and spirally winding the band-shaped sheet.

When the laminated rotor core is produced by winding the band-shaped core sheet, the band-shaped core sheet in a straight form is stamped from a metal sheet, i.e., a material, thereby improving the material yield. In accordance with this method, however, the segment core sheets having a desired shape are stamped to be connected with each other thereby to form the band-shaped core sheet, and subsequently, one strip of the band-shaped core sheet is wound and laminated sequentially until the desired lamination thickness is achieved. Thus, the method is low in productivity.

In order to solve the above problem, Japanese Unexamined Patent Application Publication No. 11-299136, for example, proposes a method for producing a laminated core (laminated stator core) by superposing and integrating band-shaped core sheets, and subsequently winding the integrated sheets. FIG. 5 shows how the core is formed according to the method. Band-shaped core sheets 72, 73 are prepared in which pole sections 71 are formed at the inner sides of yoke pieces 70 at predetermined intervals. The band-shaped core sheets 72, 73 are piled and integrated with each other. Then, the core sheets 72, 73 are spirally wound and laminated around the periphery of a mandrel (inner diameter guide cylinder) 74 with the pole sections 71 of the sheets 72, 73 aligned with one another. According to the art disclosed in the publication, the integration of the piled sheets increases the thickness of the band-shaped core sheets, thereby improving productivity of the lamination. The reference numeral 75 designates an outer diameter guide cylinder.

According to the art disclosed in the publication, however, the integration of the superposed band-shaped core sheets 72, 73 requires, e.g., welding, which makes the manufacturing operation complicated. Additionally, the superposed and integrated band-shaped core sheets are increased in stiffness. Therefore, when a laminated core having a small diameter is produced according to the method, winding of the sheets is difficult and the formed shape is deteriorated, which may cause a problem, e.g., that the pole sections are not aligned in the laminating direction.

In view of the above, Japanese Unexamined Patent Application Publication No. 1-264548 proposes a method for producing a laminated core (laminated stator core) by spirally winding a plurality of band-shaped core sheets each having arc-shaped segment core sheets connected by connecting portions while displacing the positions of the connecting portions from one another in the vertical direction.

However, since the connecting portions of the band-shaped core sheets are bent at the time of producing the laminated core, the bent connecting portions are bulged in the thickness direction compared to those yet to be bent. Thus, in the art disclosed in Japanese Unexamined Patent Application Publication No. 1-264548, there is a possibility that the bent connecting portions come into contact with the band-shaped core sheets overlaid in the vertical direction to thereby generate gaps therebetween. Compared to a core laminated without gaps, a core with gaps may require an extra pressure treatment to eliminate the gaps, or cause efficiency reduction or vibration of a motor, which results in reduction in product quality.

The present invention has been made in view of the circumstances, and thus an object of the present invention is to provide a laminated rotor core having favorable shape accuracy and product quality, and a method for manufacturing the laminated rotor core with high productivity by winding band-shaped core sheets.

DISCLOSURE OF INVENTION

To accomplish the above object, a first invention provides a laminated rotor core including a plurality of band-shaped core sheets each having arc-shaped segment core sheets, the adjacent segment core sheets connected together by a narrow-width connecting portion provided therebetween, each segment core sheet having a plurality of pole sections protruding radially outward, the plurality of band-shaped core sheets being wound in a spiral form and laminated while being bent at the connecting portions with the pole sections vertically superimposed one on another, the laminated rotor core comprising:

joining portions each joining the adjacent pole sections of each segment core sheet, the joining portions located above and below each bent connecting portion, and notches each provided at a radially outward side of each joining portion and positioned in correspondence with each bent connecting portion.

Furthermore, to accomplish the above object, a second invention provides a method for manufacturing a laminated rotor core, comprising:

a stamping step of forming a plurality of band-shaped core sheets each having arc-shaped segment core sheets, the adjacent segment core sheets connected together by a narrow-width connecting portion provided therebetween, each segment core sheet having a plurality of pole sections protruding radially outward; and an annular shape forming step of winding the plurality of band-shaped core sheets in a spiral form while bending the band-shaped core sheets at the connecting portions and superimposing the pole sections vertically one on another, thereby laminating the band-shaped core sheets;

wherein in the stamping step, a notch to be positioned in correspondence with each connecting portion bent in the annular shape forming step is formed at a radially outward side of a joining portion, the joining portion joining the adjacent pole sections in each segment core sheet and positioned above and below each bent connecting portion.

According to the laminated rotor core of the first invention, and the method for manufacturing a laminated rotor core of the second invention, a bulge in the vertical direction is produced by curving the connecting portion, and the bulge is received in the cutouts which are located above and below the bulge and formed in the radially outward portions of the joining portions between the pole sections. Thus, gaps are not formed between the vertically overlapped segment core sheets, and in particular, the band-shaped core sheets are wound closely with each other. Accordingly, the high quality laminated rotor core having favorable shape accuracy can be produced with high productivity.

In the plurality of band-shaped core sheets, since the positions of the connecting portions of the upper and lower band-shaped core sheets are not aligned, the connecting portions having a relatively inferior strength are not on the same vertical line in the laminating direction. Thus, the strength of the laminated rotor core is improved. Unlike the conventional art, the plurality of band-shaped core sheets are wound without integrating the layered band-shaped core sheets. Thus, the segment core sheets can be bent smoothly via the connecting portions, and the produced laminated rotor core has excellent shape accuracy. Furthermore, since it is not necessary to weld and integrate the band-shaped core sheets beforehand, the laminated core can be produced with high productivity.

According to the laminated rotor core of the first invention in particular, it is preferable that a first engaging groove is formed in a radially inward portion of each joining portion of the segment core sheets, and a second engaging groove is formed in a radially inward portion between the adjacent segment core sheets by mutually facing cutouts thereof. Furthermore, according to the method for manufacturing a laminated rotor core of the second invention, it is preferable that in the stamping step, a first engaging groove is formed in a radially inward portion of each joining portion of the segment core sheets, and a second engaging groove is formed in a radially inward portion between the adjacent segment core sheets by mutually facing cutouts thereof; and in the annular shape forming step, a core member having teeth to be fitted in the first engaging grooves and the second engaging grooves is rotatably driven, thereby laminating the band-shaped core sheets while pulling the band-shaped core sheets. Accordingly, the positions of the segment core sheets can be aligned precisely, and the laminated rotor core having high shape accuracy and improved product quality can be produced.

According to the laminated rotor core of the first invention and the method for manufacturing a laminated rotor core of the second invention, it is preferable that the first engaging groove and the second engaging groove each have an inner width increasing in a radially inward direction. This arrangement allows the first and the second engaging grooves to be fitted smoothly onto the teeth of the core member provided for winding the band-shaped core sheets, thereby ensuring alignment of the grooves with the teeth.

According to the laminated rotor core of the first invention, it is preferable that each segment core sheet has a pilot hole. Furthermore, according to the method for manufacturing a laminated rotor core of the second invention, it is preferable that in the stamping step, a pilot hole is formed in each segment core sheet, and in the annular shape forming step, the band-shaped core sheets are laminated and interlocked while the segment core sheets are positioned using the pilot holes. The pilot holes allow the band-shaped core sheets to be positioned accurately and easily at the time of winding the sheets.

According to the laminated rotor core of the first invention and the method for manufacturing a laminated rotor core of the second invention, it is preferable that each segment core sheet has magnet insertion portions each provided for insertion of a permanent magnet. With this arrangement, the pole sections in a simple configuration can be formed in the segment core sheets.

According to the laminated rotor core of the first invention, it is preferable that the permanent magnets are inserted in the magnet insertion portions aligned in a laminating direction, and the permanent magnets are fixed in the aligned magnet insertion portions by a resin material, the resin material injected and cured in the aligned magnet insertion portions. With this arrangement, the resin material surrounds the permanent magnet with certainty, thereby firmly fixing the permanent magnet in the magnet insertion portions.

According to the laminated rotor core of the first invention, it is preferable that a recess and a projection to be fitted therein are provided at sides of the adjacent segment core sheets. With this arrangement, the recess and the projection to be fitted therein allow the adjacent segment core sheets to be mutually positioned with accuracy.

According to the laminated rotor core of the first invention, if the number of the pole sections provided in each segment core sheet is two or three, it is easy to produce the segment core sheets since the sheets do not have a complex shape.

According to the laminated rotor core of the first invention, if side edges of the adjacent segment core sheets are closely spaced from each other, contacts between the side edges are prevented. Thus, a variation in pitch in the circumferential direction of the segment core sheets can be prevented. For example, displacement of interlocking positions of the segment core sheets in the laminating direction can be prevented. Furthermore, due to the closely spaced side edges of the adjacent segment core sheets, for example, if cutting edges of dies for blanking the segment core sheets are worn and burrs are generated at the side edges of the sheets, the contacts between the burrs can be prevented. Thus, misalignment of pitches in the circumferential direction of the segment core sheets can be prevented.

According to the method for manufacturing a laminated rotor core of the second invention, it is preferable that in the annular shape forming step, the plurality of band-shaped core sheets are oriented in the same tangential direction with respect to the laminated rotor core being formed in an annular shape. Accordingly, die devices forming the respective band-shaped core sheets can be oriented in the same direction, and thus the producing apparatus can be downsized.

According to the method for manufacturing a laminated rotor core of the second invention, it is preferable that in the annular shape forming step, the plurality of band-shaped core sheets are oriented in tangential directions at different angles with respect to the laminated rotor core being formed in an annular shape. Such a configuration allows sheet winding load to be distributed. Additionally, the band-shaped core sheets do not overlap each other when they are blanked, which makes the blanking operation easier. In particular, by winding the plurality of band-shaped core sheets from opposite directions, the operation can be performed without application of excessive load on the winding device (e.g., the core member provided in the center).

BEST MODE FOR CARRYING OUT THE INVENTION

Figure 1:
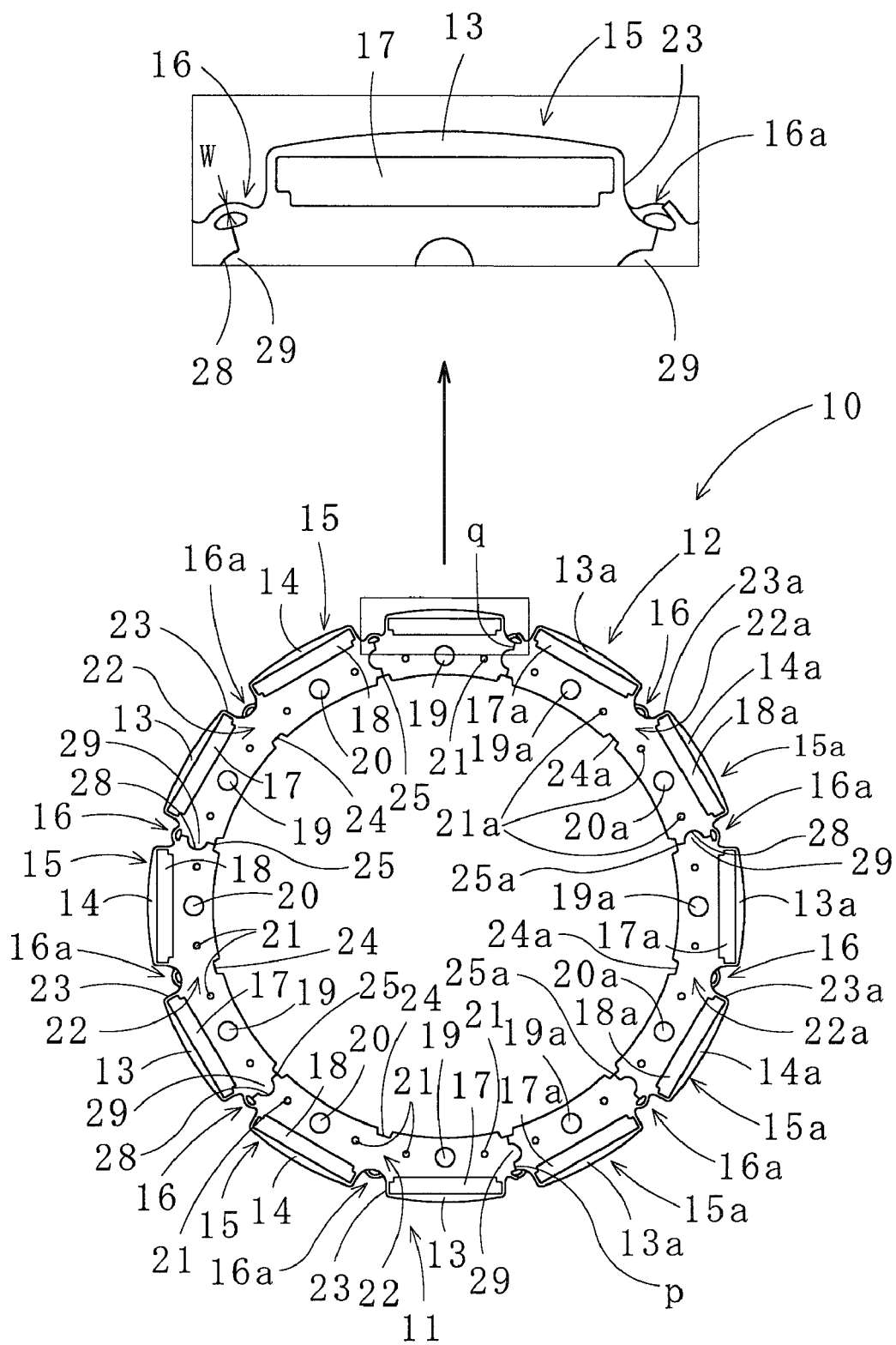
FIG. 1 is a plan view of a laminated rotor core according to one embodiment of the present invention.

As shown in FIG. 1, a laminated rotor core (hereinafter, also simply referred to as a laminated core) 10 according to one embodiment of the present invention is formed by laminating and interlocking a plurality of (two in the present embodiment) band-shaped core sheets 11, 12 while spirally winding the sheets 11, 12. The band-shaped core sheets 11, 12 have the same configuration. Thus, the components of the core sheets 11, 12 have the same reference numerals, but the reference numerals of the core sheet 12 are followed by a symbol "a," and a detailed description of the core sheet 12 is omitted.

The band-shaped core sheet 11 forming the laminated core 10 includes arc-shaped segment core sheets (pieces) 15 which are connected with each other in a straight form by narrow-width connecting portions 16. Each of the segment core sheets 15 has a plurality of (two in the present embodiment) pole sections 13, 14 protruding in the radially outward direction. Likewise, the band-shaped core sheet 12 includes segment core sheets 15a connected with each other by connecting portions 16a, and each of the segment core sheets 15a has two pole sections 13a, 14a.

The finished laminated core 10 is formed by laminating and interlocking the band-shaped core sheets 11, 12 while winding the core sheets 11, 12 spirally, bending the core sheets 11, 12 at the respective connecting portions 16, 16a, and superimposing the pole sections 13, 14a one on the other and the pole sections 14, 13a one on the other.

The band-shaped core sheet 11 is punched out of a steel strip by a pressing machine, and composed of the multiplicity of segment core sheets 15 which are connected together by the connecting portions 16. The band-shaped core sheets 11, 12 are laminated in a manner that the two pole sections 13, 14 in each segment core sheet 15 are displaced from the two pole sections 13a, 14a in each segment core sheet 15a by a pitch of one pole section. Since the finished laminated core 10 has twelve magnetic poles as shown in FIG. 1, each of the band-shaped core sheets 11, 12 which respectively have six linked segment core sheets 15, 15a forms one ring-shaped core sheet.

Magnet insertion holes (one example of a magnet insertion portion) 17, 18 in which permanent magnets (not shown) are to be inserted are formed at a radially outward side of each segment core sheet 15. The magnet insertion holes 17, 18 are provided at regular intervals on the circumference of a circle around the axis of the laminated core 10.

Accordingly, the magnet insertion holes 17, 18 are vertically aligned with the magnet insertion holes 18a, 17a, respectively.

To produce the laminated core 10, the permanent magnets are inserted in the magnet insertion holes 17, 18a and the magnet insertion holes 18, 17a aligned in the laminating direction, and then a resin material (e.g., a thermosetting resin such as an epoxy resin or a thermoplastic resin) is injected into the aligned holes 17, 18a and the aligned holes 18, 17a by transfer molding or injection molding. The resin material is cured to fix the permanent magnets in the aligned holes 17, 18a and 18, 17a.

A plurality of (two in this embodiment) pilot holes 19, 20 each consisting of a through hole (e.g., having a circular cross section) are respectively formed in central portions in the width direction of the magnet insertion holes 17, 18 provided in each of the segment core sheets 15. The pilot holes 19, 20 are provided to the radially inward sides of the magnet insertion holes 17, 18, respectively, and at regular intervals on the circumference of a circle about the axis of the laminated core 10.

Because the pilot holes 19, 20a are vertically aligned with each other and the pilot holes 20, 19a are vertically aligned with each other, the band-shaped core sheets 11, 12 can be laminated and interlocked while positioning of the segment core sheets 15, 15a is performed.

Interlocking portions 21 are formed on both sides in the circumferential direction with respect to each of the pilot holes 19, 20. Examples of the interlocking portion are well-known V-shaped interlocking portion, circular half-blanking interlocking portion, and interlocking portion formed by bending a cut portion, which may be used alone or in combination.

The two pole sections 13, 14 are connected together by a joining portion 22 provided in a center part in the circumferential direction of each segment core sheet 15.

As described above, the laminated core 10 is produced by laminating the two band-shaped core sheets 11, 12 with the sheets 11, 12 misaligned for a pitch of one pole section. Thus, joining portions 22a coupling the pole sections 13a, 14a of the other band-shaped core sheet 12 are positioned above and below the bent connecting portions 16 of the one band-shaped core sheet 11. Likewise, the joining portions 22 coupling the pole sections 13, 14 of the one band-shaped core sheet 11 are positioned above and below the bent connecting portion 16a of the other band-shaped core sheet 12.

Thus, a notch 23 to be positioned in correspondence with the bent connecting portion 16a is provided at a radially outward side of each joining portion 22, thereby receiving a bulge in the thickness direction of the bent connecting portion 16a. The notch 23 has a semicircular shape when viewed from the top thereof, but may have an elliptical arc shape or a square shape, for example.

The notch 23 is hollowed such that at least the projection in the thickness direction formed by curving the connecting portion 16a does not come into contact with the joining portion 22. In the present embodiment, the notch 23 is formed such that the magnet insertion holes 17, 18 are positioned on the circumference of a circle passing through the most concave position of the notch 23 or at the radially outward side of the circumference. Accordingly, the pole sections 13, 14 can project radially outward of the laminated core 10.

A first engaging groove 24 is provided at the radially inward side of each joining portion 22 of the segment core sheets 15, and a first engaging groove 24a is provided at the radially inward side of each joining portion 22a of the segment core sheets 15a. Furthermore, a second engaging groove 25 comprising mutually facing cutouts is located at the radially inward portion between the adjacent segment core sheets 15, and a second engaging groove 25a comprising mutually facing cutouts is located at the radially inward portion between the adjacent segment core sheets 15a.

Figure 2:
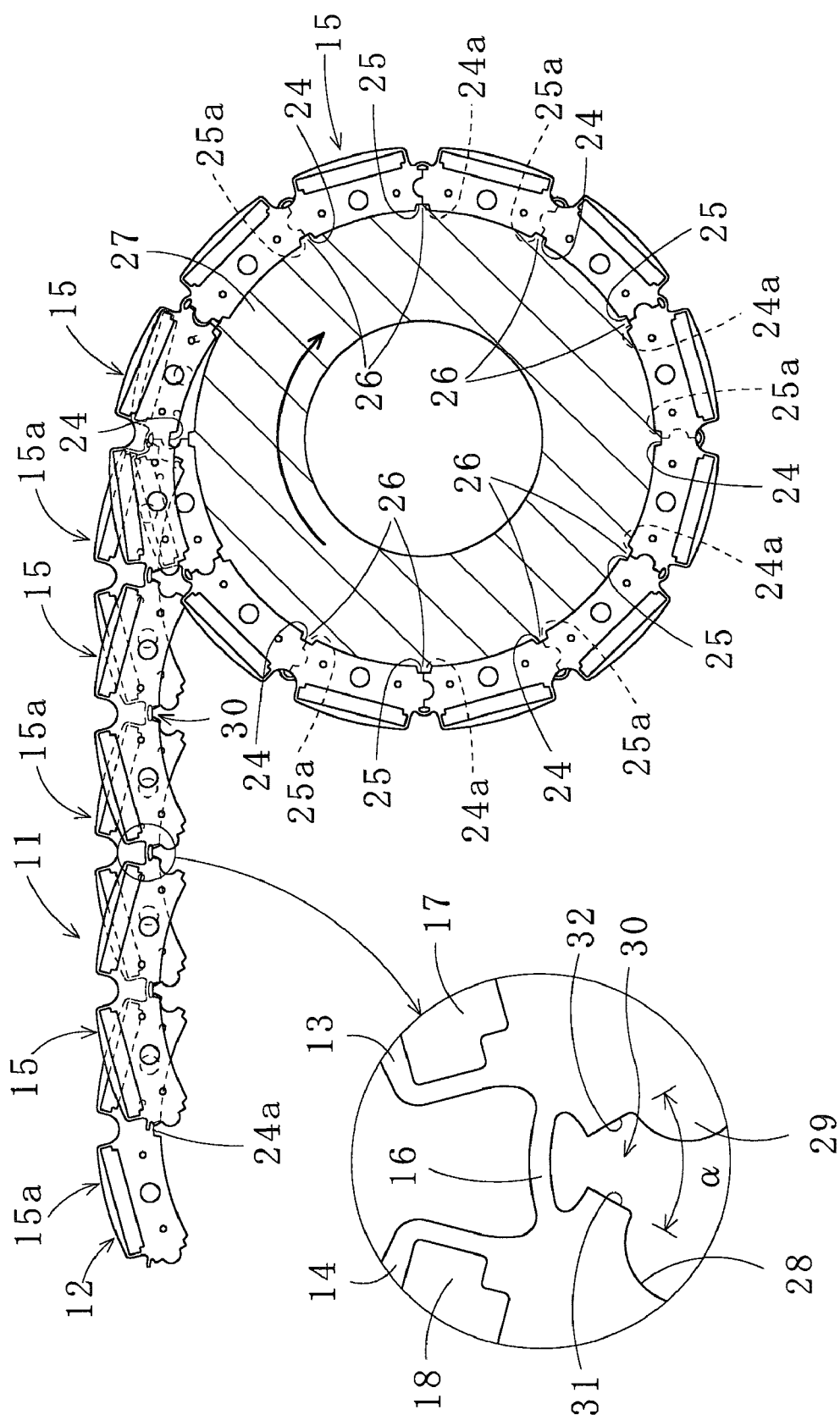
FIG. 2 is an explanatory view of a method for manufacturing a laminated rotor core according to a first embodiment of the present invention.

Accordingly, as shown in FIG. 2, a columnar shaped (or cylindrical shaped) mandrel (one example of a core member) 27 has teeth 26 in the periphery thereof to be fitted in the engaging grooves 24, 24a, 25, 25a, and the mandrel 27 is rotatably driven by a rotary driving source (not shown) thereby to laminate the band-shaped core sheets 11, 12 while pulling the sheets. Thus, the first engaging groove 24 in the segment core sheet 15 is aligned with the second engaging groove 25a in the segment core sheet 15a, and the second engaging groove 25 in the segment core sheet 15 is aligned with the first engaging groove 24a in the segment core sheet 15a.

Since the circumferential width of the engaging grooves 24, 24a, 25, 25a increases in a radially inward direction (toward the axis) of the laminated core 10, the teeth 26 are engaged with the grooves smoothly.

A recess 28 that has a semicircle shape when viewed from the top thereof and a projection 29 to be fitted therein are provided at the respective sides of the adjacent segment core sheets 15, 15 (15a, 15a). Each of the connecting portions 16, 16a is provided at the radially outward side of the recess 28 and projection 29.

After the curving of the connecting portion 16, side edges of the adjacent segment core sheets 15 including the recess 28 and projection 29 are closely spaced apart with a gap of, e.g., 20-30 μm inclusive therebetween. Alternatively, the side edges may be in contact with each other. Such arrangement of the side edges allows mutual positioning of the adjacent segment core sheets 15 to be carried out more accurately, thereby improving circular accuracy of the laminated core.

The width (radial length) "w" of each connecting portion 16 is, e.g., about 0.5-3 mm inclusive. The connecting portions 16 mechanically connect the adjacent segment core sheets 15, and form bending portions for making the entire core annular by bending the adjacent segment core sheets 15 radially inward. Thus, when the segment core sheets 15 are connected together in a straight shape, that is, immediately after the band-shaped core sheet 11 is punched out of the steel strip, a cut portion 30 is formed at the inner side of each connecting portion 16 as shown in FIG. 2.

The cut portion 30 disappears when the band-shaped core sheet 11 is formed in a ring shape, and the angle formed by the mutually facing cut sides 31, 32 becomes 0 degrees. In the state of the band-shaped core sheet 11, the angle (a) formed by the cut sides 31, 32 is 60 degrees in this embodiment.

In general, when the ring-shaped core sheet is divided into "m" (six in the present embodiment) segment core sheets each having "n" (two in the present embodiment) pole sections, the angle formed by the cut sides is (360/m) degrees.

Next, a method for manufacturing a laminated rotor core according to a first embodiment of the present invention is described with reference to FIGS. 1, 2.

First, the steel strip is blanked by a pressing machine to form the plurality of band-shaped core sheets 11, 12.

In this instance, the notch 23 is formed in the radially outward portion of the joining portion 22 between the pole sections 13, 14 of each segment core sheet 15 included in the band-shaped core sheet 11. The first engaging groove 24 is formed in the radially inward portion at the center in the circumferential direction of each segment core sheet 15, and the mutually facing cutouts to form the second engaging groove 25 are formed at the radially inward sides of the adjacent segment core sheets 15. Then, the pilot holes 19, 20 are formed in each segment core sheet 15. The band-shaped core sheet 12 is processed in the same manner. (Stamping Step)

Next, as shown in FIG. 2, the band-shaped core sheets 11, 12 are spirally wound around the periphery of the mandrel 27 while the two band-shaped core sheets 11, 12 oriented in the same tangential direction are superposed one on another in a manner that the pole sections 13, 14a and the pole sections 14, 13a are aligned with each other, whereas the connecting portions 16, 16a are in different positions. The starting points of winding the band-shaped core sheets 11, 12 are displaced from one another, e.g., by 180 degrees±a one-pole-section pitch angle (30 degrees in the present embodiment) as designated by the symbols "p" and "q" in FIG. 1. Alternatively, the starting points of the band-shaped core sheets 11, 12 may be in the same position.

The mandrel 27 used for the winding operation has the teeth 26 to be fitted in the engaging grooves 24, 24a, 25, 25a. The projection height of the teeth 26 in the radial direction may be about 1-0.3 times the radial length (depth) of the engaging grooves 24, 24a, 25, 25a. Connected to the rotary driving source (not shown), the mandrel 27 rotates on its axis.

The rotation of the mandrel 27 allows the teeth 26 to be fitted in the engaging grooves 24, 24a, 25, 25a, thereby laminating the band-shaped core sheets 11, 12 while drawing the sheets 11, 12 onto the mandrel 27.

In this embodiment, the band-shaped core sheets 11, 12 are wound around the mandrel 27 with a 30-degree phase shift. Thus, the positions of the connecting portions 16, 16a of the vertically adjoining band-shaped core sheets 11, 12 have a phase shift with an angle of one pole section pitch (an angle between the adjacent pole sections).

The interlocking portions 21, 21a are provided in the segment core sheets 15, 15a forming the band-shaped core sheets 11, 12, respectively. Accordingly, while the segment core sheets 15, 15a are positioned by respectively aligning the pilot holes 19, with the pilot holes 20a, 19a, the band-shaped core sheets 11, 12 are wound in an annular form in a manner that the upper sheet 11 is precisely superimposed on the lower sheet 12. In this instance, the upper and lower segment core sheets 15, 15a are pressed by a pressing tool (not shown) from above, and thus the core sheets 15, 15a are laminated while being interlocked with each other.

Instead of the pilot holes 19, 19a, 20, 20a, the magnet insertion holes 17, 17a, 18, 18a may be used for the positioning of the segment core sheets 15, 15a.

Figure 3:
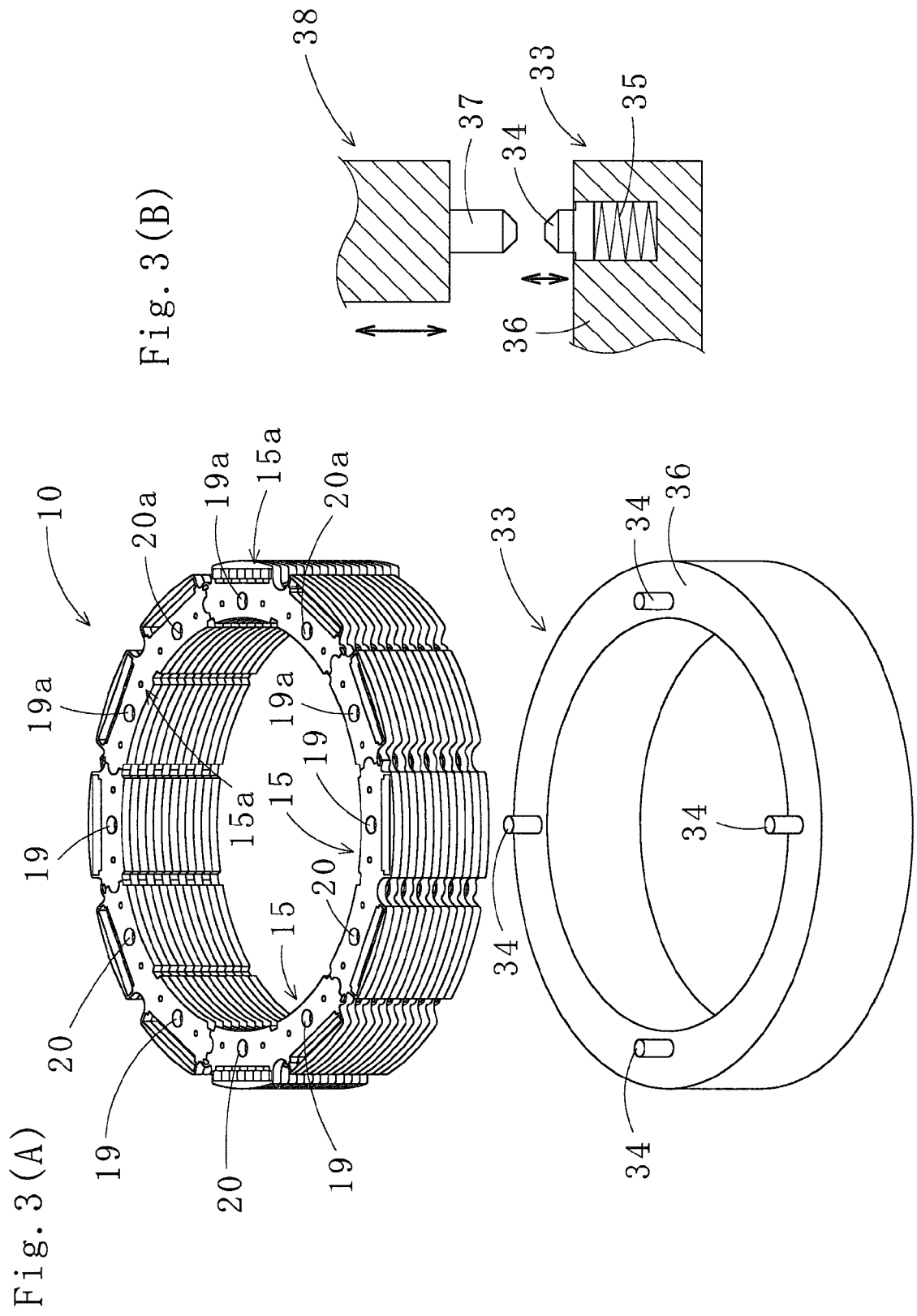
FIGS. 3(A) and 3(B) are explanatory views of another laminating process performed in the method for manufacturing a laminated rotor core.

Furthermore, the band-shaped core sheets 11, 12 may be laminated using a product receiving plate 33 shown in FIGS. 3(A), 3(B) without using the above-mentioned mandrel 27. In this case, it is not necessary to provide the engaging grooves in the band-shaped core sheets.

The product receiving plate 33 includes tapered projecting pins 34 to be inserted in the laminated pilot holes 19, 20a and 19a, 20. A spring member (resilient member) 35 is provided under each projecting pin 34, and each projecting pin 34 is retractable with respect to a receiving mount 36 of the product receiving plate 33. Furthermore, the projecting pins 34 are provided in the receiving mount 36 at regular intervals in the circumferential direction thereof. The number of the pins 34 is, e.g., four or more, and ½-¼ of the total number of the pilot holes in the band-shaped core sheet 11 (or the band-shaped core sheet 12).

Accordingly, while positioning of the segment core sheets 15, 15a is carried out with the projecting pins 34 protruded from the receiving mount 36, the upper and lower band-shaped core sheets 11, 12 are wound in an annular form in a manner that the upper sheet is superimposed on the lower sheet precisely. The product receiving plate 33 may be rotated to wind the band-shaped core sheets 11, 12. Alternatively, the band-shaped core sheets 11, 12 may be wound around the product receiving plate 33.

Then, using a pressing tool 38 provided with tapered positioning pins 37 for interlocking, the wound band-shaped core sheets 11, 12 are pressed from above thereby to laminate and interlock the upper and lower segment core sheets 15, 15a. In this instance, the tips of the positioning pins 37 press the tips of the projecting pins 34, causing the projecting pins 34 to be retracted within the receiving mount 36. This arrangement allows the positioning pins 37 to be inserted in the laminated pilot holes 19, 20a and the laminated pilot holes 19a, 20 to the full depths thereof, and enables precise positioning. Furthermore, sandwiched between the product receiving plate 33 and the pressing tool 38, the wound band-shaped core sheets 11, 12 are sufficiently pressed.

The band-shaped core sheets 11, 12 may be stamped by a pressing device immediately before they are wound around the mandrel 27 (or on the product receiving plate 33) and laminated. Besides, the previously stamped band-shaped core sheets 11, 12 may be prepared, and wound around the mandrel 27. (Annular Shape Forming Step)

Figure 4:
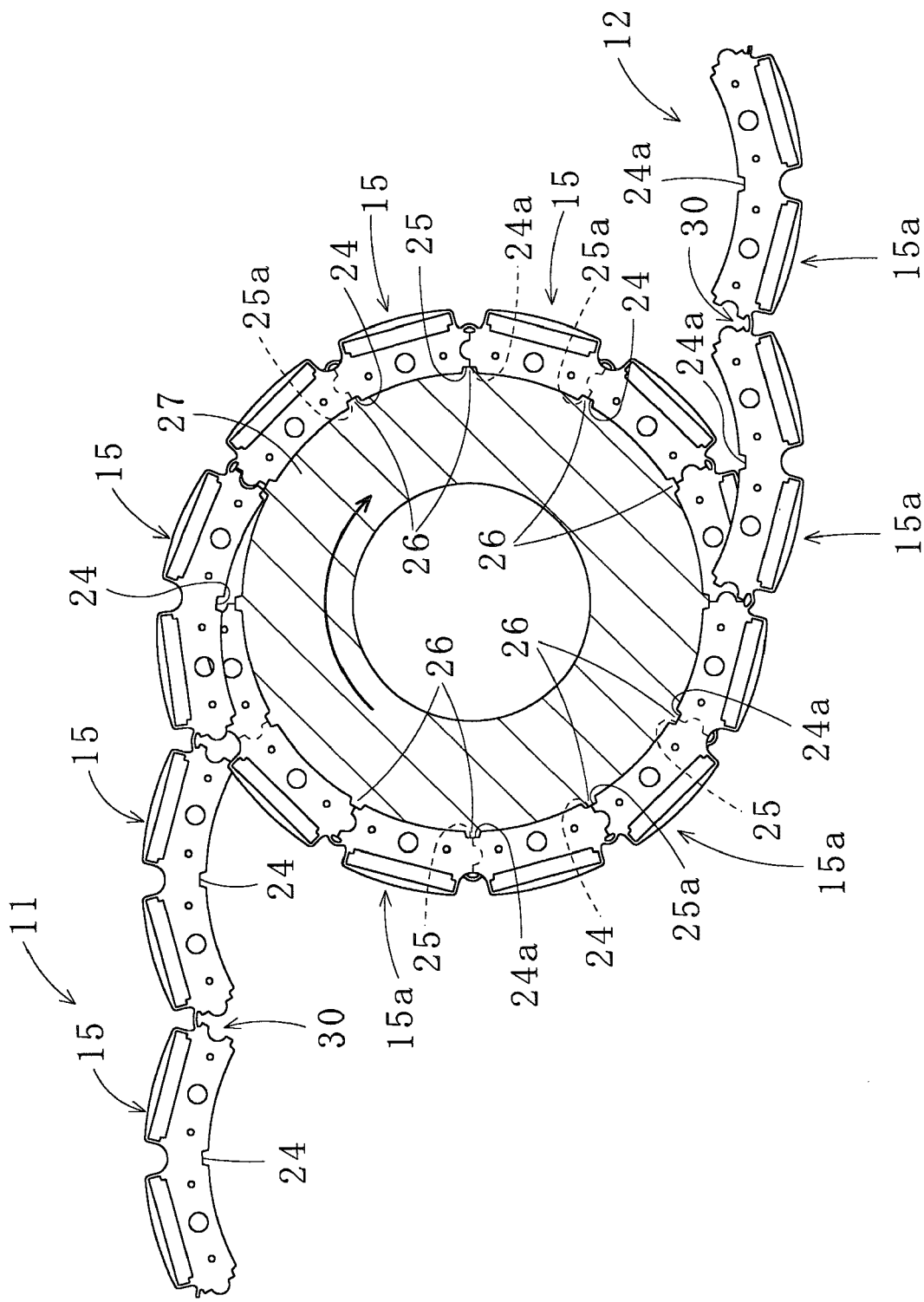
FIG. 4 is an explanatory view of a method for manufacturing a laminated rotor core according to a second embodiment of the present invention.
Figure 5:
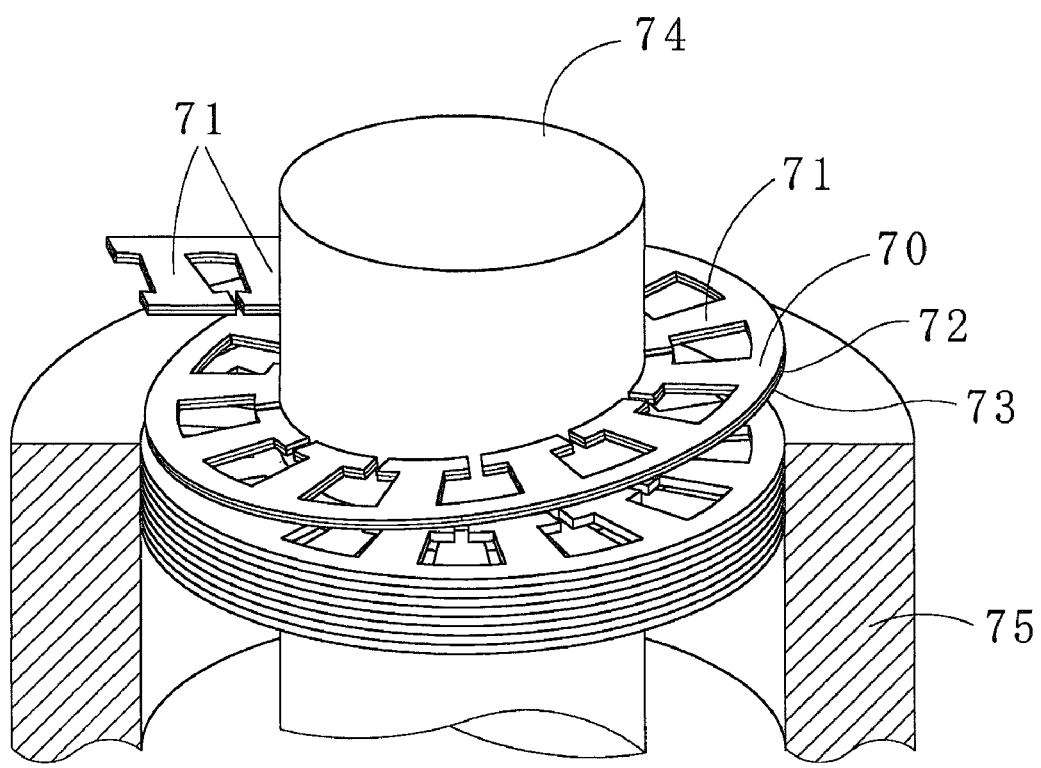
FIG. 5 is an explanatory view of a method for manufacturing a laminated core according to prior art.

Next, with reference to FIG. 4, a method for manufacturing a laminated rotor core according to a second embodiment of the present invention is described.

As shown in FIG. 4, the segment core sheets 15, 15a are wound in a state that the winding phases of the band-shaped core sheets 11, 12 are shifted from each other by 180 degrees with respect to the mandrel 27. Thus, the bending moment is not applied to the mandrel 27, and the steady operation can be done. Start points of winding the band-shaped core sheets 11, 12 oriented in tangential directions at different angles (by 180 degrees) have a phase difference of 180 degrees±an angle for one pole section pitch. And the interlocking portions 21, 21a are provided at predetermined positions in the segment core sheets 15, 15a forming the band-shaped core sheets 11, 12, respectively. These two features are common to the method according to the first embodiment of the present invention.

The present invention has been described with reference to the embodiments. However, the present invention is not limited to the structures described in the above embodiments, and includes other embodiments and modifications made without departing form the spirit and scope of the present invention. For example, a laminated rotor core and a method for manufacturing the same configured by combining a part or all of the above-mentioned embodiments and modifications fall within the rights of the present invention.

Furthermore, neither the shape of the segment core sheets forming the band-shaped core sheet nor the shape of the connecting portions connecting the segment core sheets is limited to those of the embodiments. Alternatively, the segment core sheets and connecting portions may have any shapes. The configuration of a laminated rotor core to be produced is not limited to those of the embodiments, and may be different.

In the embodiments, when thin band-shaped core sheets are used to form a laminated rotor core having a large diameter, it is difficult to wind each band-shaped core sheet only by rotation of the mandrel. Thus, it is preferable that an extra guide device is employed to guide each segment core sheet of the band-shaped core sheets in predetermined angular positions to bend the connecting portions at a predetermined angle. The guide device preferably has a member for guiding the radially outward sides of the segment core sheets, and a member for guiding the band-shaped core sheets from above and/or below.

Furthermore, in the embodiments, the laminated rotor core is produced with the two band-shaped core sheets. Alternatively, the laminated rotor core may be produced with three or more (e.g., four or six) band-shaped core sheets. The above band-shaped core sheet is formed of the connected segment core sheets each having the two pole sections. However, each segment core sheet may have three, or four or more pole sections.

INDUSTRIAL APPLICABILITY

According to the laminated rotor core and method for manufacturing the same of the present invention, the bulge in the vertical direction is produced by bending the connecting portion which connects the adjacent segment core sheets, and the bulge is received in the cutouts which are located above and below the bulge and formed in the radially outward portions of the joining portions between the pole sections. Thus, gaps are not formed between the layered segment core sheets. Accordingly, a laminated rotor core having high shape precision is produced with high productivity.

In the plurality of band-shaped core sheets, since the connecting portions of the vertically stacked band-shaped core sheets are displaced from one another, the connecting portions having a relatively inferior strength are not on the same vertical line in the laminating direction. Thus, the strength of the entire laminated rotor core is improved.

Unlike the conventional art, the plurality of band-shaped core sheets are wound without integrating overlapped band-shaped core sheets. Thus, the segment core sheets can be curved smoothly via the connecting portions. Furthermore, since it is not necessary to weld and integrate the band-shaped core sheets beforehand, the laminated core can be produced with high productivity.

The invention claimed is:

1. A laminated rotor core including a plurality of band-shaped core sheets each having arc-shaped segment core sheets, the adjacent segment core sheets connected together by a narrow-width connecting portion provided therebetween, each segment core sheet having a plurality of pole sections protruding radially outward, the plurality of band-shaped core sheets being wound in a spiral form and laminated while being bent at the connecting portions with the pole sections vertically superimposed one on another, the pole sections of one band-shaped core sheet being displaced from the pole sections of another band-shaped core sheet by a pitch of one pole section, the laminated rotor core comprising:

joining portions each joining the adjacent pole sections of each segment core sheet, the joining portions located above and below each bent connecting portion, and notches each provided at a radially outward side of each joining portion and positioned in correspondence with each bent connecting portion, each of the notches receiving a bulge in the thickness direction of the bent connecting portion formed by bending the connecting portion.

2. The laminated rotor core as defined in claim 1, wherein a first engaging groove is formed in a radially inward portion of each joining portion of the segment core sheets, and a second engaging groove is formed in a radially inward portion between the adjacent segment core sheets by mutually facing cutouts thereof.

3. The laminated rotor core as defined in claim 2, wherein the first engaging groove and the second engaging groove each have an inner width increasing in a radially inward direction.

4. The laminated rotor core as defined in claim 1, wherein each segment core sheet has a pilot hole.

5. The laminated rotor core as defined in claim 1, wherein each segment core sheet has magnet insertion portions each provided for insertion of a permanent magnet.

6. The laminated rotor core as defined in claim 5, wherein the permanent magnets are inserted in the magnet insertion portions aligned in a laminating direction, and the permanent magnets are fixed in the aligned magnet insertion portions by a resin material, the resin material injected and cured in the aligned magnet insertion portions.

7. The laminated rotor core as defined in claim 1, wherein a recess and a projection to be fitted therein are provided at sides of the adjacent segment core sheets.

8. The laminated rotor core as defined in claim 1, wherein the number of the pole sections provided in each segment core sheet is two or three.

9. The laminated rotor core as defined in claim 1, wherein side edges of the adjacent segment core sheets are closely spaced from each other.

10. A method for manufacturing a laminated rotor core, comprising:
    a stamping step of forming a plurality of band-shaped core sheets each having arc-shaped segment core sheets, the adjacent segment core sheets connected together by a narrow-width connecting portion provided therebetween, each segment core sheet having a plurality of pole sections protruding radially outward; and
    an annular shape forming step of winding the plurality of band-shaped core sheets in a spiral form while bending the band-shaped core sheets at the connecting portions and superimposing the pole sections vertically one on another with the pole sections of one band-shaped core sheet displaced from the pole sections of another band-shaped core sheet by a pitch of one pole section, thereby laminating the band-shaped core sheets;
    wherein in the stamping step, a notch to be positioned in correspondence with each connecting portion bent in the annular shape forming step is formed at a radially outward side of a joining portion, the notch receiving a bulge in the thickness direction of the bent connecting portion formed by bending the connecting portion, the joining portion joining the adjacent pole sections in each segment core sheet and positioned above and below each bent connecting portion.

11. The method for manufacturing a laminated rotor core as defined in claim 10, wherein in the stamping step, a first engaging groove is formed in a radially inward portion of each joining portion of the segment core sheets, and a second engaging groove is formed in a radially inward portion between the adjacent segment core sheets by mutually facing cutouts thereof; and
    in the annular shape forming step, a core member having teeth to be fitted in the first engaging grooves and the second engaging grooves is rotatably driven, thereby laminating the band-shaped core sheets while pulling the band-shaped core sheets.

12. The method for manufacturing a laminated rotor core as defined in claim 10, wherein in the stamping step, a pilot hole is formed in each segment core sheet, and in the annular shape forming step, the band-shaped core sheets are laminated and interlocked while the segment core sheets are positioned using the pilot holes.

13. The method for manufacturing a laminated rotor core as defined in claim 11, wherein in the annular shape forming step, the plurality of band-shaped core sheets are oriented in the same tangential direction with respect to the laminated rotor core being formed in an annular shape.

14. The method for manufacturing a laminated rotor core as defined in claim 11, wherein in the annular shape forming step, the plurality of band-shaped core sheets are oriented in tangential directions at different angles with respect to the laminated rotor core being formed in an annular shape.

15. The method for manufacturing a laminated rotor core as defined in claim 14, wherein the number of the band-shaped core sheets is two.

16. The method for manufacturing a laminated rotor core as defined in claim 15, wherein the two band-shaped core sheets are wound around the core member with a phase shift of 180 degrees with respect to the core member.

17. The method for manufacturing a laminated rotor core as defined in claim 16, wherein the number of the pole sections provided in each segment core sheet is two or three.

* * * * *